United States Patent
Mehl

(10) Patent No.: US 9,904,157 B2
(45) Date of Patent: Feb. 27, 2018

(54) METHOD AND APPARATUS FOR IRRADIATION OF AN IMAGING OPTICAL SYSTEM OF A PROJECTOR

(71) Applicant: OSRAM GmbH, Munich (DE)

(72) Inventor: Oliver Mehl, Berlin (DE)

(73) Assignee: OSRAM GmbH, Munich (DE)

( * ) Notice: Subject to any disclaimer, the term of this patent is extended or adjusted under 35 U.S.C. 154(b) by 36 days.

(21) Appl. No.: 14/394,298

(22) PCT Filed: Apr. 17, 2013

(86) PCT No.: PCT/EP2013/057986
§ 371 (c)(1),
(2) Date: Oct. 14, 2014

(87) PCT Pub. No.: WO2013/156522
PCT Pub. Date: Oct. 24, 2013

(65) Prior Publication Data
US 2015/0062540 A1    Mar. 5, 2015

(30) Foreign Application Priority Data
Apr. 20, 2012  (DE) .................. 10 2012 206 525

(51) Int. Cl.
*G03B 21/20* (2006.01)
*G03B 33/08* (2006.01)
(Continued)

(52) U.S. Cl.
CPC ....... *G03B 21/2013* (2013.01); *G03B 21/005* (2013.01); *G03B 21/204* (2013.01);
(Continued)

(58) Field of Classification Search
CPC .............. G03B 21/005; G03B 21/2013; G03B 21/2033; G03B 21/204; G03B 33/08;
(Continued)

(56) References Cited

U.S. PATENT DOCUMENTS

2006/0018025 A1   1/2006  Sharon et al.
2007/0153862 A1   7/2007  Shchegrov et al.
(Continued)

FOREIGN PATENT DOCUMENTS

| JP | 2007218956 A | 8/2007 |
| WO | 2006073397 A1 | 7/2006 |
| WO | 2012007027 A1 | 1/2012 |

OTHER PUBLICATIONS

International Search Report issued for PCT/EP2013/057986 dated Oct. 22, 2013.
(Continued)

*Primary Examiner* — Sultan Chowdhury
*Assistant Examiner* — Magda Cruz
(74) *Attorney, Agent, or Firm* — Viering, Jentschura & Partner mbB

(57) ABSTRACT

Various embodiments may relate to a method for irradiating an imaging optical system of a projector. The imaging optical system is irradiated with light of different colors from different semiconductor light sources sequentially, both with individual colors and superimposed as mixed light.

16 Claims, 3 Drawing Sheets

(51) Int. Cl.
*G03B 21/00* (2006.01)
*H04N 9/31* (2006.01)
(52) U.S. Cl.
CPC ......... *G03B 21/2033* (2013.01); *G03B 33/08* (2013.01); *H04N 9/3111* (2013.01); *H04N 9/3161* (2013.01); *H04N 9/3182* (2013.01)
(58) Field of Classification Search
CPC .............. G03B 21/2066; H04N 9/3111; H04N 9/3161; H04N 9/3182
See application file for complete search history.

(56) References Cited

U.S. PATENT DOCUMENTS

| | | |
|---|---|---|
| 2009/0021456 A1 | 1/2009 | Deppe et al. |
| 2009/0086170 A1 | 4/2009 | El-Ghoroury et al. |
| 2009/0135315 A1 | 5/2009 | Endo et al. |
| 2010/0328625 A1* | 12/2010 | Miyazaki ............. G02B 26/008 353/85 |
| 2011/0116050 A1 | 5/2011 | Katou |
| 2011/0175934 A1 | 7/2011 | Paulussen et al. |
| 2012/0201030 A1* | 8/2012 | Yuan ................... G02B 26/008 362/293 |
| 2013/0250546 A1* | 9/2013 | Hu ........................ F21V 9/08 362/84 |
| 2014/0247429 A1* | 9/2014 | Ogino ................. H04N 9/3111 353/31 |

OTHER PUBLICATIONS

Search Report issued for German patent application 102012206525.3 dated May 29, 2013.

\* cited by examiner

METHOD AND APPARATUS FOR IRRADIATION OF AN IMAGING OPTICAL SYSTEM OF A PROJECTOR

RELATED APPLICATIONS

The present application is a national stage entry according to 35 U.S.C. § 371 of PCT application No. PCT/EP2013/057986 filed on Apr. 17, 2013, which claims priority from German application No. 10 2012 206 525.3 filed on Apr. 20, 2012, and is incorporated herein by reference in its entirety.

TECHNICAL FIELD

Various embodiments generally relate to a method for irradiating an imaging optical system of a projector, wherein the imaging optical system is irradiated with light of different colors from different light sources, in particular semiconductor light sources. Various embodiments also relate to a projector for carrying out the method, wherein the projector includes an imaging optical system and at least two semiconductor light sources which generate light of different colors, for illuminating the imaging optical system. Various embodiments are preferably applicable to video projectors.

BACKGROUND

In video projectors, the image generation is based on targeted switching on and off of individual pixels of a light beam with the aid of an imaging optical system ("imager"), e.g. on the basis of a DLP ("Digital Light Processing"), LCD ("Liquid Crystal Display") or LCoS ("Liquid Crystal on Silicon") technology. In order to represent a specific color, light from a light source with broadband emission (e.g. a discharge lamp) is decomposed into its primary colors (e.g. by means of a rotating color wheel with corresponding color filters), which are then alternated sequentially in the necessary power proportions usually using a single imager (in the case of DLP technology, for example, as so-called single-chip DLP technology). This also applies, in particular, to the representation of "white". Assuming that three primary colors (e.g. red, green and blue) are alternated with the temporal proportion of in each case a respectively defined temporal proportion of in each case one third, for example, correspondingly each of the three sequentially active primary color channels is also utilized only during this time proportion. This results in the disadvantage that the luminous flux utilized amounts to only a portion, for example one third of the luminous flux that is technically maximally available (in which case all three primary color channels would be utilized to the extent of 100%).

In order partly to resolve this disadvantage, the color wheel can also contain a transmitted-light segment having a high transmission which is not wavelength-dependent ("white segment"). The size of the white segment is fixedly predefined by the technical implementation and then can no longer be changed during the operation of the video projector. Owing to this restriction, it is necessary to optimize the color wheel once by means of the segment division for a specific type of application of the projector (e.g. for a data projection with high areal proportion of white or a projection of image material with a high color saturation).

A dynamic adaptation of the power with regard to the individual color proportions in the sequential mixed light can be effected by the so-called Unishape method from Osram, in which the power consumption of a mercury vapor lamp and thus the luminance in the arc of the mercury vapor lamp is varied very rapidly in a manner synchronized with color segments of a color wheel, that is to say that the lamp is operated briefly with lower or higher power. In this regard, lighting properties such as color proportions, brightness, etc. can be adapted. In single-chip DLP projectors, a color temperature and a color saturation can thus be significantly increased by this method. However, the length of the color segments cannot be varied in this case.

Furthermore, video projectors are known which use semiconductor light sources and phosphor conversion in order to generate a sequential succession of the primary colors.

SUMMARY

Various embodiments provide a method for irradiating an imaging optical system of a projector, wherein the imaging optical system is irradiated with light of different colors from different semiconductor light sources sequentially, both with individual colors and superimposed as mixed light.

By means of this method, the imaging optical system may be irradiated in a sequential succession of different colors at times with the mixed light, whereby a higher luminous flux is achieved. The use of the semiconductor light sources makes possible, in contrast to the use of a color wheel, a dynamic setting of individual color proportions by means of a temporal change (lengthening or shortening) of an activity of the respectively associated at least one semiconductor light source. Moreover, a luminous flux may be varied during an activity of the semiconductor light sources by means of a variation of the associated operating current. As a result, e.g. a simple compatibility with the Unishape method may be established in turn. Furthermore, no additional hardware costs are required in the implementation of the method.

In order to carry out a DLP projection, for example, the imaging optical system may include a micromirror device, e.g. a microsystem referred to as "digital micromirror device" (DMD). However, the imaging optical system may also include a reflective or transmissive liquid crystal display unit (LCD), e.g. in order to carry out an LCD or LCoS method.

The light of different colors which is generated by different semiconductor light sources (directly or indirectly) may be monochromatic with at least substantially only one pure color (e.g. green, blue or red) or multichromatic with a plurality of individual colors (e.g. a green and a blue color or color proportion, which together produce a greenish-white or turquoise light). The multichromatic light may result, for example, from an only partial wavelength conversion of a primary light emitted by a semiconductor light source, by means of a phosphor sensitive thereto.

The fact that the imaging optical system is irradiated sequentially, both with individual colors and superimposed as mixed light, relates to the light generated by the semiconductor light sources. Therefore, "with individual colors" may be understood to mean, in particular, (monochromatic or multichromatic) light generated by one or an identical type of semiconductor light source(s), while the mixed light consists, in particular, of a temporal and spatial superimposition or combination of light generated by different or different types of semiconductor light source(s).

In one configuration, the imaging optical system is irradiated with mixed light including light of only a portion of the colors. As a result of the at least temporary avoidance of mixed light including light of all the colors (i.e. including light from all the semiconductor light sources or types thereof simultaneously), a higher luminous flux than in the case of a purely sequential irradiation with a color saturation that at the same time is still high is provided. By way of example, in the case where four colors are provided, the imaging optical system may be irradiated with mixed light including light of two colors and/or three colors. This principle may also be extended to even more than four colors.

In one particular configuration thereof, the imaging optical system is irradiated with mixed light including light including (only) two colors. As a result of the avoidance of mixed light including light of more than two colors (i.e. including light from more than two different semiconductor light sources or types thereof simultaneously), a higher luminous flux than in the case of a purely sequential irradiation in conjunction with a color saturation that at the same time is high is provided.

In another configuration, the imaging optical system is irradiated by sequential successions of light of different colors, and wherein successive light of different colors is superimposed for a predetermined combination time duration for generating the mixed light. This configuration enables the semiconductor light sources to be driven particularly simply.

In a further configuration, the imaging optical system is irradiated with mixed light of any possible combination of two colors. As a result, a high number of two-colored mixed colors is provided, which supports naturally perceived image reproduction.

In yet another configuration, the imaging optical system is irradiated sequentially, both with individual colors and with mixed light including a combination of light of all the colors. A particularly high luminous flux may be provided as a result.

In one configuration, furthermore, the light of different colors corresponds to a set of primary colors. In this regard, a large color space or gamut of the image to be projected may be provided.

In one configuration, moreover, the imaging optical system is irradiated by sequential successions of red, green and blue light, wherein successive light of different primary colors is superimposed for a predetermined combination time duration to form yellow, cyan-colored and magenta-colored mixed light, respectively. This enables a high color saturation by virtue of a separate white segment being avoided. Rather, in the case of a color change between two primary colors, an overlap or a superimposition of these two primary colors takes place for a certain time duration ("combination time duration"). During the combination time duration, therefore, the imaging optical system is operated in each case by means of red and green light, green and blue light and blue and red light at the same time. As a result of the temporal superimposition of the primary colors, the total luminous flux is increased, but white light is not generated simultaneously. Instead, a new set of mixed colors is generated (here: yellow from red and green, cyan from green and blue and magenta from blue and red). The temporal integration of the yellow, cyan-colored and magenta-colored light then gives rise to the desired additional luminous flux having a white effect. This configuration may be used for film projection, in particular.

In one configuration, in addition, the imaging optical system is irradiated by white mixed light. This configuration may be used, in particular, for types of projection or projection applications which require a high luminous flux, e.g. for data projection. For this purpose, the primary colors are all operated simultaneously for a predefined time. During the white segment, the imaging optical system then preferably switches on all the pixels which are intended to represent white. A dynamic variation of the white light proportion is possible (e.g. by means of an adjustment of the length or intensity thereof).

The object is also achieved by means of a projector, including an imaging system and at least two semiconductor light sources which generate light of different colors, for illuminating the imaging optical system, wherein the projector is designed to carry out the method as described above.

This projector has the same advantages as the method and may may be configured analogously.

The at least two semiconductor light sources which generate light of different colors can, for example, generate the light directly ("primary light") or indirectly by irradiation of at least one phosphor and subsequent at least partial wavelength conversion into secondary light. The individual color of a light from a semiconductor light source may therefore be, in particular, monochromatic or multichromatic.

In one development, at least one semiconductor light source has a light emitting diode. In another development, at least one semiconductor light source has a laser. Each color may be generated by one or a plurality of semiconductor light sources.

The at least one semiconductor light source may contain at least one wavelength-converting phosphor (e.g. may be a conversion LED). The phosphor may alternatively or additionally be arranged in a manner remote from the semiconductor light source (as one which emits, in particular, only the primary light) ("remote phosphor"). The at least one semiconductor light source may therefore also include a light source with a phosphor excited by at least one semiconductor light source, or such a phosphor element.

If a light emitting diode is present, it may be present in the form of an individually packaged light emitting diode or in the form of an LED chip. A plurality of LED chips may be mounted on a common substrate ("submount"). The at least one light emitting diode may be equipped with at least one dedicated and/or common optical system for beam guiding, e.g. at least one Fresnel lens, collimator, and so on. Instead of or in addition to inorganic light emitting diodes, e.g. based on InGaN or AlInGaP, organic LEDs (OLEDs, e.g. polymer OLEDs) may generally be used as well.

In one development, the projector is converted as a single-chip DLP projector and for this purpose includes a DLP micromirror device as the imaging optical system, which is designed to project light generated by the semiconductor light sources with the aid of the above method pixel by pixel onto a projection screen or projection plane. At least one optical element, e.g. a deflection mirror, a lens, etc., may be disposed upstream and/or downstream of the DLP micromirror device.

In another development, the projector is embodied as a single-LCD projector, e.g. on the basis of a reflective or light-transmissive liquid crystal display (LCD), e.g. as a single-LCoS projector.

In one configuration, the semiconductor light sources each have at least one light emitting diode or laser for generating light of blue color, at least one light emitting diode for generating light of red color and at least one light emitting diode or laser-excited phosphor element for generating light of green color. This enables a particularly compact construction having high light intensity.

The blue light may include or be, in particular, light from a wavelength range of between 420 nm and 490 nm, in particular between 440 nm and 480 nm, in particular between 445 nm and 460 nm.

The green light may include or be, in particular, light from a wavelength range of between 490 nm and 575 nm.

The red light may include or be red light in the narrower sense (in particular from a wavelength range of between 650 nm and 750 nm), orange-colored light in the narrower sense (in particular from a wavelength range of between 585 nm and 620 nm) and/or amber-colored light in the narrower sense (in particular from a wavelength range of between 620 nm and 650 nm). The red light (in the broader sense) may therefore include or be, in particular, light from a wavelength range of between 585 nm and 750 nm.

These wavelengths may relate, in particular, to a peak wavelength or center wavelength.

More specifically, the projector may include at least one "blue" laser for generating blue light, at least one "red" light emitting diode for generating red light and at least one "green" laser-excited phosphor element for generating green light.

In another specific development, at least one "blue" light emitting diode is used instead of the at least one "blue" laser.

In one specific development, moreover, at least one "green" light emitting diode is used instead of the at least one "green" laser-excited phosphor element.

In another configuration, the projector is switchable between a plurality of operating modes. This enables the projector to have a particularly wide range of application. The fact that the projector is switchable between a plurality of operating modes may mean, in particular, that the projector utilizes for the respective operating mode a respectively different type and length of mixed light portions which enable the best compromise between luminous flux and color saturation for the operating mode chosen.

The operating modes may include, for example, a data projection, a color image projection, a black-and-white image projection and/or a film projection.

In a further configuration, the projector is operated in an operating mode in which the imaging optical system is irradiated by sequential successions of red, green and blue light, wherein successive light of different primary colors is superimposed for a predetermined combination time duration to form yellow, cyan-colored and magenta-colored mixed light, respectively. This enables a particularly high color saturation in conjunction with high luminous flux, which may be particularly advantageous for the operating mode of film projection.

In yet another configuration, the projector is operated in an operating mode in which the imaging optical system is irradiated by white mixed light. This enables a particularly high luminous flux in conjunction with sufficient color saturation, which may be particularly advantageous for the operating mode of data projection.

In one configuration, in addition, an activity duration of the semiconductor light sources is variably adjustable. In this regard, an even more variable adaptation of the light projected by the projector is made possible.

In one development, furthermore, an operating value of the light sources (e.g. an operating current) and/or an activity duration of the light sources are/is adjustable or variable in a manner dependent on the image content to be projected.

In particular, the projector may also be designed to realize a dark period, in which no light is projected. An image brightness may be reduced, for example, by means of the dark period.

The projector may be embodied as a video projector, for example.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
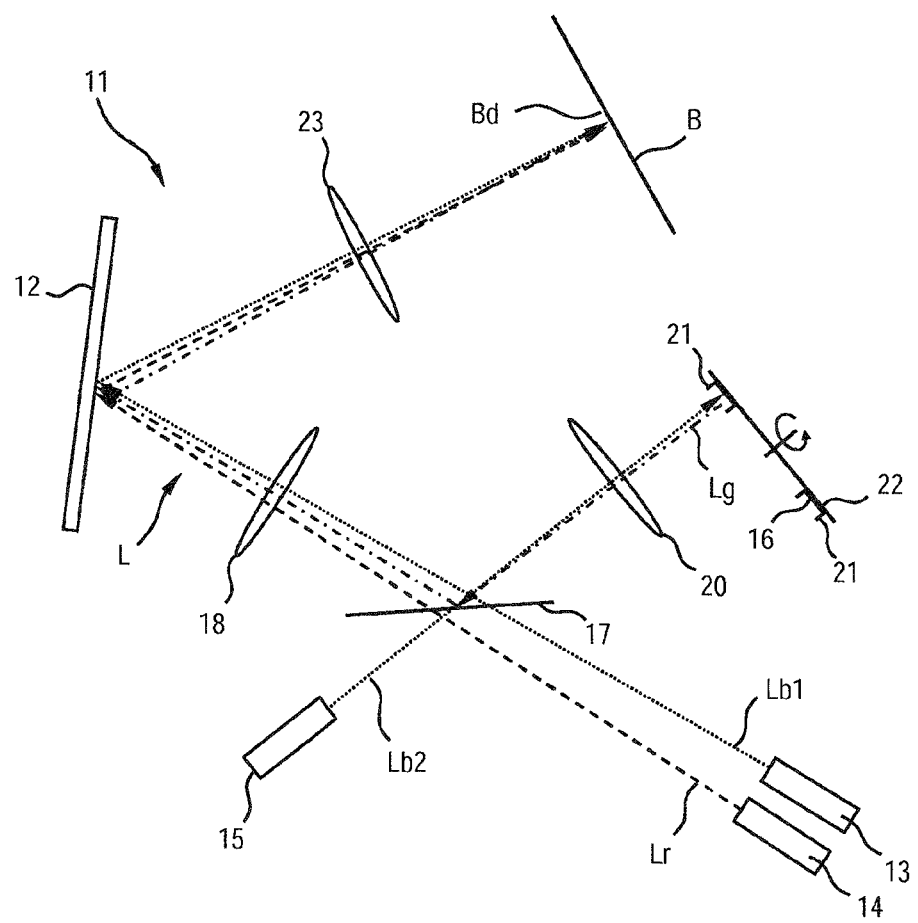
FIG. 1 shows selected elements of a projector in oblique view.

FIG. 1 shows selected elements of a projector 11 in oblique view, which projector may be operated e.g. as a video projector. The projector 11 includes an imaging optical system in the form of a DLP micromirror device and three semiconductor light sources 13, 14 and 15, 16 which generate light of different colors, for illuminating the imaging optical system 12. The projector 11 is therefore embodied as a single-chip DLP projector.

The first semiconductor light source is an (at least) blue laser 13, which projects its blue (primary) light Lb1 through a partly transmissive mirror 17 and further through a transmitted-light optical system 18, e.g. one or a plurality of lenses, onto the imaging optical system 12. From the imaging optical system 12, the blue light Lb1 is reflected (typically via an optical system 23) pixel by pixel onto an image plane B and generates there a blue light proportion of an image Bd to be projected by the projector 11.

The second semiconductor light source is a (at least one) red light emitting diode 14, which projects its red (primary) light Lr through the partly transmissive mirror 17 and further through the transmitted-light optical system 18 onto the imaging optical system 12. From the imaging optical system 12, the red light Lr is reflected pixel by pixel onto the image plane B and generates there a red light proportion of the image Bd to be projected by the projector 11.

The third semiconductor light source includes a (at least one) blue laser 15, which projects its blue (primary) light Lb2 through the partly transmissive mirror 17 and further through a transmitted-light optical system 20, e.g. one or a plurality of lenses, onto a ring-shaped conversion region 21 including a phosphor 16, here: a rotating wheel 22. The rotating wheel 22 serves to prevent the phosphor 16 from being heated to an excessively great extent, by virtue of the fact that it rotates the phosphor 16 under the stationary light spot generated by the blue laser 15. The conversion region 21 may alternatively also be embodied in a ring-sector-shaped fashion or in a ring-shaped fashion only in portions. The phosphor 16 converts the blue light Lb2 at least substantially completely into green light Lg. The green light Lg is guided by means of the transmitted-light optical system 20 onto the partly transmissive mirror 17. The blue laser 15 and the phosphor 16 may also be regarded as a semiconductor light source in the form of a laser-excited phosphor element 15, 16.

The partly transmissive mirror 17 is embodied as reflective, rather than transmissive, to the green light Lg, such that it is reflected from the partly transmissive mirror 17 through the transmitted-light optical system 18 onto the imaging optical system 12. From the imaging optical system 12, the green light Lg is reflected pixel by pixel onto the image plane B and generates there a green light proportion of the image Bd to be projected by the projector 11.

The projector 11 is switchable between a plurality of operating modes, as explained below with reference to an activation or timing diagram of the semiconductor light sources 13, 14 and 15, 16 that is associated with a respective operating mode.

Figure 2:
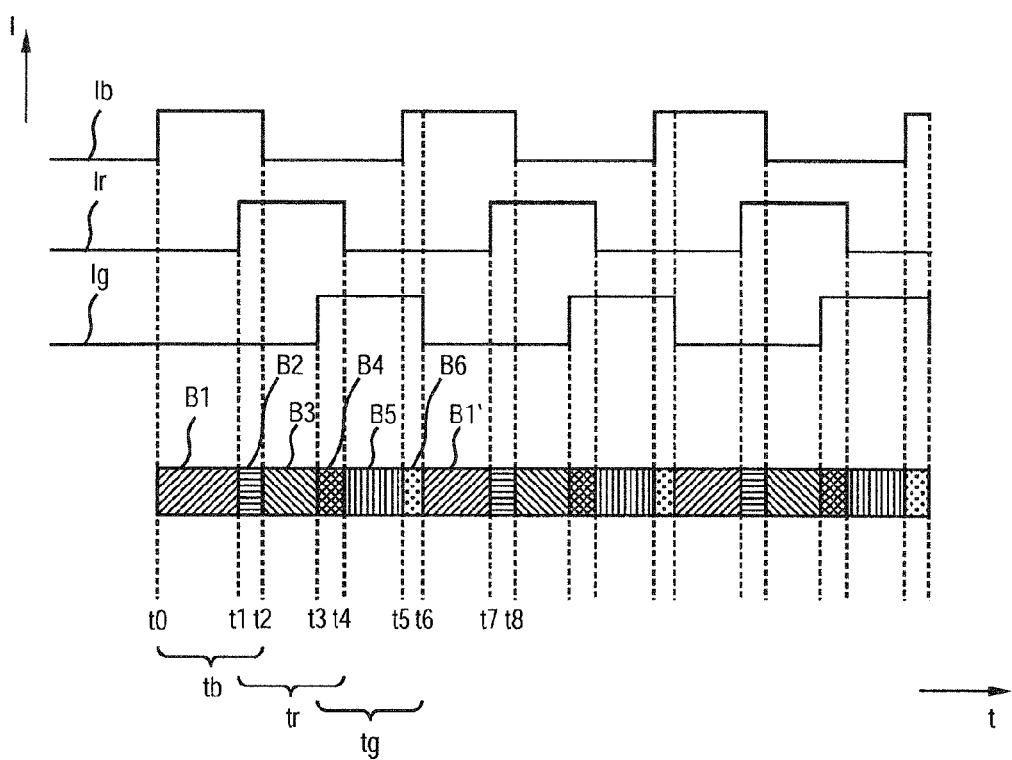
FIG. 2 shows a first activation or timing diagram by means of which the projector from FIG. 1 may be operated.

FIG. 2 shows a first activation or timing diagram of the semiconductor light sources 13, 14 and 15, 16 by means of which the projector 11 from FIG. 1 may be operated, namely in particular for data projection. The first timing diagram shows a plot of operating currents Ib, Ir and Ig against time t, said operating currents being introduced in a manner like clock signals into the semiconductor light sources 13, 14 and 15, respectively. The operating currents Ib, Ir and Ig correspond to a good approximation to the luminous flux of the semiconductor light sources 13, 14 and 15, 16, respectively. The operating currents Ib, Ir and Ig are switched on only for a specific switched-on duration or activation duration tb=t2−t0 and t8−t5, etc., tr=t4−t1, etc., and tg=t6−t3, etc., respectively. The switched-on durations tb, tr and tg may differ or may be identical at least in pairs, in particular in their entirety.

The operating currents Ib, Ir and Ig are clocked such that the imaging optical system 12 is irradiated sequentially, both with individual colors and superimposed with mixed light. Beginning at a starting instant t0, for example, only the operating current Ib that operates the blue laser 13 is switched on, such that moreover only the blue laser 13 emits its blue light Lb1. In this case, the imaging optical system 12 is irradiated with a single color, namely only blue.

At a subsequent instant t1, the operating current Ir that operates the red light emitting diode 14 is additionally switched on, and then the operating current Ib is switched off again only subsequently at an instant t2. The single-colored blue irradiation for a time duration B1=t1−t0 is followed by a superimposed irradiation of the imaging optical system 12 for a time duration ("combination time duration") B2=t2−t1. During the time duration B2, therefore, the imaging optical system 12 is irradiated with two colors with blue-red or magenta-colored mixed light from the blue laser 13 and the red light emitting diode 14.

Starting from the instant t2 until an instant t3, there ensues once again a single-colored, red time duration B3=t3−t2. At the instant t3, the operating current Ig that operates the blue laser 15 is additionally switched on, and the operating current Ir of the red light emitting diode 14 is switched off again only subsequently at an instant t4. Therefore, the time duration B3 is followed by a superimposed irradiation of the imaging optical system 12 for a combination time duration B4=t4−t3 with red-green or yellow mixed light from the red light emitting diode 14 and the laser-excited phosphor element 15, 16.

Starting from the instant t4 until an instant t5, there ensues once again a single-colored, now green time duration B5=t5 −t4. At the instant t5, the operating current Ib that operates the blue laser 13 is additionally switched on, and the operating current Ig of the blue laser 15 is switched off again only subsequently at an instant t6. Therefore, the green time duration B5 is followed by superimposed irradiation of the imaging optical system 12 for a combination time duration B6=t6−t5 with blue-green or cyan-colored mixed light from the blue laser 13 and the laser-excited phosphor element 15, 16.

After the blue laser 15 is switched off at the instant t6, there ensues once again a single-colored blue time duration B1'=t7−t6, followed by the time durations B2 to B6, etc.

The time segment resulting from the combination of the time durations B1 or B1' to B6 may, in particular, be so short that it is not resolved temporally by a human eye and is therefore perceived integrally in terms of color, despite its sequential basic form.

Optionally, the switched-on or activity durations tb, tr and tg of the semiconductor light sources 13, 14, 15, 16 and/or the time durations B1 or B1' to B6 may be variably adjusted. In this regard, an even more variable adaptation of the light projected by the projector is made possible.

In particular, the activation or timing diagram may optionally also have a dark period, during which none of the semiconductor light sources 13-16 is active.

Figure 3:
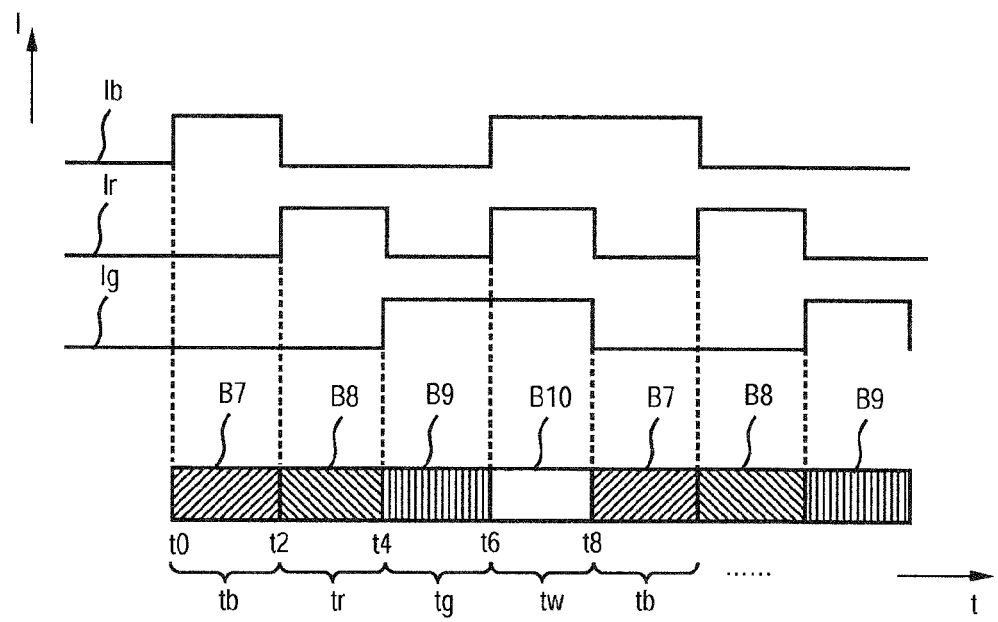
FIG. 3 shows a second activation or timing diagram by means of which the projector from FIG. 1 may be operated.

FIG. 3 shows a second activation or timing diagram by means of which the projector 11 from FIG. 1 may be operated, namely in particular for film projection.

In this case, the semiconductor light sources 13-16 are operated in such a way (their operating currents Ib, Ir and Ig, respectively, are switched in such a way) that two-colored combination time durations B2, B4 and B6 no longer occur, rather firstly only single-colored time durations B7 (blue)=t2−t0, B8 (red)=t4−t2 and B9 (green)=t6−t4 are generated sequentially successively.

In order to provide a high luminous flux, a white light segment B10 is additionally generated for a time duration t8−t6. During the white light segment, all the semiconductor light sources 13-16 are activated, such that a red-green-blue or white mixed light is generated.

In this case, too, the switched-on or activity durations tb, tr and tg of the semiconductor light sources 13-16 and/or the time durations B7 to B10 may be variably adjusted. In particular, the activation or timing diagram may optionally also be able to generate a dark period, during which none of the semiconductor light sources 13-16 is active.

The time segment resulting from the combination of the time durations B7 to B10 may, in particular, be so short that it is not resolved temporally by a human eye and is therefore perceived integrally in terms of color, despite its sequential basic form.

In one configuration, in addition, an activity duration of the semiconductor light sources is variably adjustable. In this regard, an even more variable adaptation of the light projected by the projector is made possible.

In particular, the projector may also be designed to realize a dark period, in which no light is projected. By means of a dark period, by way of example, an image brightness may be reduced without an operating current of the semiconductor light sources having to be adapted.

In this regard, the sequences shown in FIG. 2 and FIG. 3 may also be combined, e.g. by implementing two-colored mixed light B2, B4 and/or B6 and additionally a white segment.

The sequences shown in FIG. 2 and FIG. 3 may be assigned to a respective operating mode of the projector and may be selected optionally as desired.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for irradiating an imaging optical system of a projector, wherein the imaging optical system is irradiated with light of different colors from different semiconductor light sources for a predetermined switched-on duration and sequentially, both with individual colors and as each color temporally superimposed such that white mixed light is generated.

2. The method as claimed in claim 1, wherein the imaging optical system is irradiated with mixed light comprising light of only a portion of the colors.

3. The method as claimed in claim 2, wherein the imaging optical system is irradiated with mixed light comprising light of two colors.

4. The method as claimed in claim 3, wherein the imaging optical system is irradiated by sequential successions of light of different colors, and wherein successive light of different colors is superimposed for a predetermined combination time duration for generating the mixed light.

5. The method as claimed in claim 2, wherein the imaging optical system is irradiated by sequential successions of light of different colors, and wherein successive light of different colors is superimposed for a predetermined combination time duration for generating the mixed light.

6. The method as claimed in claim 5, wherein the imaging optical system is irradiated by sequential successions of red, green and blue light, wherein successive light of different primary colors is superimposed for a predetermined combination time duration to form yellow, cyan-colored and magenta-colored mixed light, respectively.

7. The method as claimed in claim 2, wherein the imaging optical system is irradiated with mixed light of any possible combination of two colors.

8. The method as claimed in claim 1, wherein the imaging optical system is irradiated sequentially, both with individual colors and with mixed light comprising a combination of light of all the colors.

9. The method as claimed in claim 1, wherein the light of different colors corresponds to a set of primary colors.

10. The method as claimed in claim 9, wherein the imaging optical system is irradiated by sequential successions of red, green and blue light, wherein successive light of different primary colors is superimposed for a predetermined combination time duration to form yellow, cyan-colored and magenta-colored mixed light, respectively.

11. A projector, comprising:
an imaging optical system and
at least two semiconductor light sources which generate light of different colors, for illuminating the imaging optical system
wherein
the imaging optical system is irradiated with light of different colors from different semiconductor light sources for a predetermined switched-on duration and sequentially, both with individual colors and as each color temporally superimposed such that white mixed light is generated.

12. The projector as claimed in claim 11, wherein the semiconductor light sources each have
at least one light emitting diode or laser for generating light of blue color,
at least one light emitting diode for generating light of red color and
at least one light emitting diode or laser-excited phosphor element for generating light of green color.

13. The projector as claimed in claim 11, wherein the projector is switchable between a plurality of operating modes.

14. The projector as claimed in claim 13, wherein the light of different colors corresponds to a set of primary colors in one operating mode.

15. The projector as claimed in claim 13, wherein in one operating mode,
the imaging optical system is irradiated with mixed light comprising light of only a portion of the colors,
the imaging optical system is irradiated by sequential successions of light of different colors, and wherein successive light of different colors is superimposed for a predetermined combination time duration for generating the mixed light, and
the imaging optical system is irradiated by sequential successions of red, green and blue light, wherein successive light of different primary colors is superimposed for a predetermined combination time duration to form yellow, cyan-colored and magenta-colored mixed light, respectively.

16. The projector as claimed in claim 11, wherein an activity duration of the semiconductor light sources is variably adjustable.

\* \* \* \* \*